United States Patent
Che et al.

(10) Patent No.: US 7,365,531 B2
(45) Date of Patent: Apr. 29, 2008

(54) MAGNETIC READER RECORDING CHARACTERIZATION AT SLIDER OR BAR LEVEL

(75) Inventors: Xiaodong Che, Saratoga, CA (US); Wenchien David Hsiao, San Jose, CA (US); Yansheng Luo, Fremont, CA (US); Xiaoyu Sui, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 141 days.

(21) Appl. No.: 11/004,456

(22) Filed: Dec. 3, 2004

(65) Prior Publication Data

US 2006/0119354 A1    Jun. 8, 2006

(51) Int. Cl.
*G01R 33/12* (2006.01)

(52) U.S. Cl. ...................................... 324/210

(58) Field of Classification Search ................ 324/210, 324/212
See application file for complete search history.

(56) References Cited

U.S. PATENT DOCUMENTS

| | | | |
|---|---|---|---|
| 3,710,235 A | 1/1973 | Barrager et al. | |
| 5,926,019 A | 7/1999 | Okumura | |
| 6,111,406 A * | 8/2000 | Garfunkel et al. | 324/210 |
| 6,479,988 B2 | 11/2002 | Hachisuka et al. | |
| 6,696,831 B2 * | 2/2004 | Nozu | 324/210 |
| 2004/0036994 A1 | 2/2004 | Kainuma et al. | |
| 2004/0056650 A1 | 3/2004 | Boutaghou et al. | |
| 2004/0104722 A1 | 6/2004 | Kainuma et al. | |

FOREIGN PATENT DOCUMENTS

| | | |
|---|---|---|
| JP | 60164915 | 8/1985 |
| JP | 9147460 | 6/1997 |

OTHER PUBLICATIONS

"Magnetic Recording Characterization System" IBM TDB, Jan. 1968, pp. 1235ff.
"Static Tester for Thin Film Magnetic Heads" IBM TDB, Jan. 1973, pp. 2618.
"Inductive Tape Synthesizer for R W Head Testing" IBM TDB, Jan. 1969, pp. 1043ff.
"Magnetic Head Tester" IBM TDB, Aug. 1963, pp. 1f.

* cited by examiner

*Primary Examiner*—Reena Aurora
(74) *Attorney, Agent, or Firm*—Duke Amaniampong (57) ABSTRACT

An apparatus for reader characterization is described. The apparatus includes a rotator for rotating a media. The media can contain a signal having a value for a function of a read/write head being assessed. The rotator is operable in conjunction with said apparatus. The apparatus also includes a proximator for proximalizing the media to the read/write head. The proximator is operable in conjunction with said apparatus. The apparatus further includes a writer operable in conjunction with said assembly. The writer writes the signal upon the media. The signal emits the value of the function. The signal is detectable by a reader of the read/write head. The apparatus additionally includes an interface operable in the apparatus for providing removable orientation of the read/write head in an assessing position. The assessing position enables a reader of the read/write head to detect the signal upon rotation of the signal through the assessing position.

20 Claims, 7 Drawing Sheets

MAGNETIC READER RECORDING CHARACTERIZATION AT SLIDER OR BAR LEVEL

FIELD OF THE INVENTION

The present invention relates to magnetic head fabrication. More particularly, the present invention provides an apparatus for assessing reader recording characterization at the slider or bar level during magnetic head fabrication.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 40 years ago and resembles a phonograph. That is, the hard drive model includes a plurality of storage disks or hard disks vertically aligned about a central core that spin at a standard rotational speed. A plurality of magnetic read/write transducer heads, for example, one head per surface of a disk, is mounted on the actuator arm. The actuator arm is utilized to reach out over the disk to or from a location on the disk where information is stored. The complete assembly, e.g., the arm and head, is known as a head gimbal assembly (HGA).

In operation, the pluralities of hard disks are rotated at a set speed via a spindle motor assembly having a central drive hub. Additionally, there are channels or tracks evenly spaced at known intervals across the disks. When a request for a read of a specific portion or track is received, the hard disk drive aligns a head, via the arm, over the specific track location and the head reads the information from the disk. In the same manner, when a request for a write of a specific portion or track is received, the hard disk drive aligns a head, via the arm, over the specific track location and the head writes the information to the disk.

Over the years, refinements of the disk and the head have provided great reductions in the size of the hard disk drive. For example, the original hard disk drive had a disk diameter of 24 inches. Modern hard disk drives are generally much smaller and include disk diameters of less than 2.5 inches (micro drives are significantly smaller than that). Refinements also include the use of smaller components and laser advances within the head portion. That is, by reducing the read/write tolerances of the head portion, the tracks on the disk can be reduced in size by the same margin. Thus, as modem laser and other micro recognition technology are applied to the head, the track size on the disk can be further compressed.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPM) can be achieved. For example, it is not uncommon for a hard disk drive to reach speeds of 15,000 RPM. This second refinement provides weight and size reductions to the hard disk drive and increases the linear density of information per track. Increased rates of revolution also provide a faster read and write rate for the disk and decrease the latency, or time required for a data area to become located beneath a head, thereby providing increased speed for accessing data. The increase in data acquisition speed due to the increased RPM of the disk drive and the more efficient read/write head portion provide modem computers with hard disk speed and storage capabilities that are continually increasing.

Particularly, with regard to data storage devices, these advances have attributed to increases in storage density. However, the increase in storage density has led to weaker and/or smaller signal strength emitted by each data bit. This has required the development of read/write heads having increased sensitivity to the intensity of the signals emitted by the data bits. Increased sensitivity needs require improved testing techniques to ensure proper and precise functioning of the read/write head.

Figure 1A:
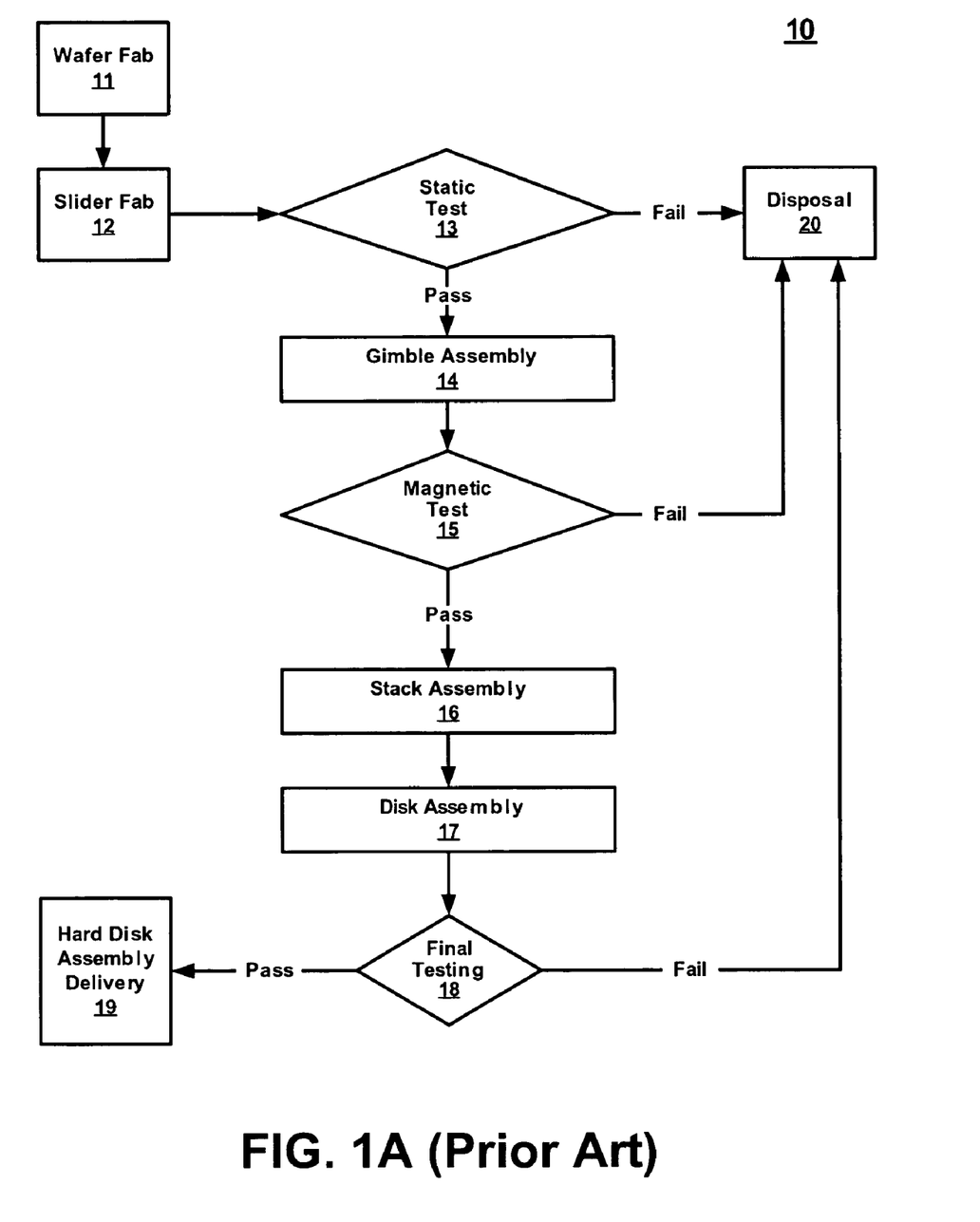
FIG. 1A is a prior art diagram of a flowchart showing portions of a conventional read/write head fabrication and testing process.

Specifically, within the read/write head fabrication and assembly process, there are general processes that are performed on the read/write head prior to the read/write head being mounted into the hard disc drive assembly. Prior art FIG. 1A is an exemplary flowchart 10 of a process for fabrication and testing of a read/write during certain stages of the fabrication process.

Step 11 is the wafer fabrication. This step is where the components of the read/write head are created. Examples of some of the components that may be implemented in a read/write head fabricated on the wafer may include a magnetic shield layer(s), the pinned layer, the conductive spacer layer, the free layer (sensor), the contact layer, the writer layer, and additional layers and/or components. There may be thousands of read/write heads fabricated on a single wafer.

Subsequent to completing wafer fabrication 11, the process continues to step 12, slider fabrication 12. Slider fabrication 12 is a process for cutting the wafers into thousands of individual sliders where each slider has a reader and a write element and a proper air-bearing surface on one side of the slider. Slider fabrication can include slicing the read/write head from the wafer, lapping each slider to achieve a proper reader strip height and resistance, are on design target, and to define the air-bearing surface. Slider fabrication can also include depositing a protective overcoat for protection against corrosion and head disk interface robustness.

Subsequent to the lapping process in slider fabrication 12, the process proceeds to step 13, a quasi-static test (QST). QST 13 is for testing reader signal amplitude (sensor sensitivity), reader asymmetry (similar peak to peak readings for a waveform) and reader instability. QST 13 has several shortcomings, one of which is while QST 13 is a functional test it is not a direct test. For example, the slider is placed into conventional magnetic field, referred to as a uniform field. This uniformity does not replicate the field emitted from a platter (disc) as the disc emits small local fields. The measurement can also be affected by changes in reader shield shapes and properties.

A further shortcoming to QST 13 using a uniform field is that QST 13 does not test the read/write head for recession, protrusion, or other deformity. If the read/write head has recessions, the reader is not disposed on the edge of the air-bearing surface (ABS). Because of the applied uniform field, the transducer is not effectively screened. If the read/write head is not disposed at the ABS, the read/write head will not function properly when applied to a disc where each bit region may emit varying charge states. A uniform field only determines if the head can sense, not the sensing accuracy of the read/write head Another shortcoming to QST 13 is matching the characteristics of the local small fields emitted from a disc. To enable this, an offset is provided in case of change in design of a shield. The shield is a structure that isolates the reader from adjacent bit fields, thus providing better resolution. When the reader reads from one bit space, the reader is not influenced by an adjacent bit region. However, the shield provides an extra field during QST 13. Thus, when the data relative to the extra field in the shield is accessed, a correction factor is needed. Further, when the reader or shield design changes or an alternatively designed reader is subject to QST 13, the correction factors required modifications. While QST 13 can return favorable numbers within the static test, QST 13 does not adequately address reader value quality and/or real performance, and the results vary upon fabrication inconsistencies and design changes. For example, if QST 13 gives a number 10 (acceptable for one design) and then gives the number 10 for another design, this number may not be correct because of the shielding characteristics. QST 13 requires adjustment to obtain the real value, and the value varies from configuration to configuration. The value is not uniform nor is the value universally applicable. If the read/write head fails QST 13, the read/write head is rejected, e.g., sent to disposal 20.

However, upon the read/write head passing QST 13, the read/write head slider is then sent to step 14, head gimble assembly process (HGA) 14. In HGA 14, the read/write head slider is mounted to an entire assembly, the head gimble assembly. The HGA includes the slider and the suspension, the flex component. The slider is commonly bonded to the suspension. The suspension has a spring-like quality, which causes the air-bearing surface of the read/write head slider to be placed against the platter to cause the slider to fly at a precise distance from the platter.

Once the HGA is completed in step 14, the process proceeds to step 15, a dynamic electrical test (DET) 15, also referred to as a magnetic dynamic test (MDT). DET 15 has been implemented for testing read/write head performance as a QST 13 does not test for characteristical deficiencies in the read/write head slider. DET 15 tests an entire HGA assembly.

Figure 1B:
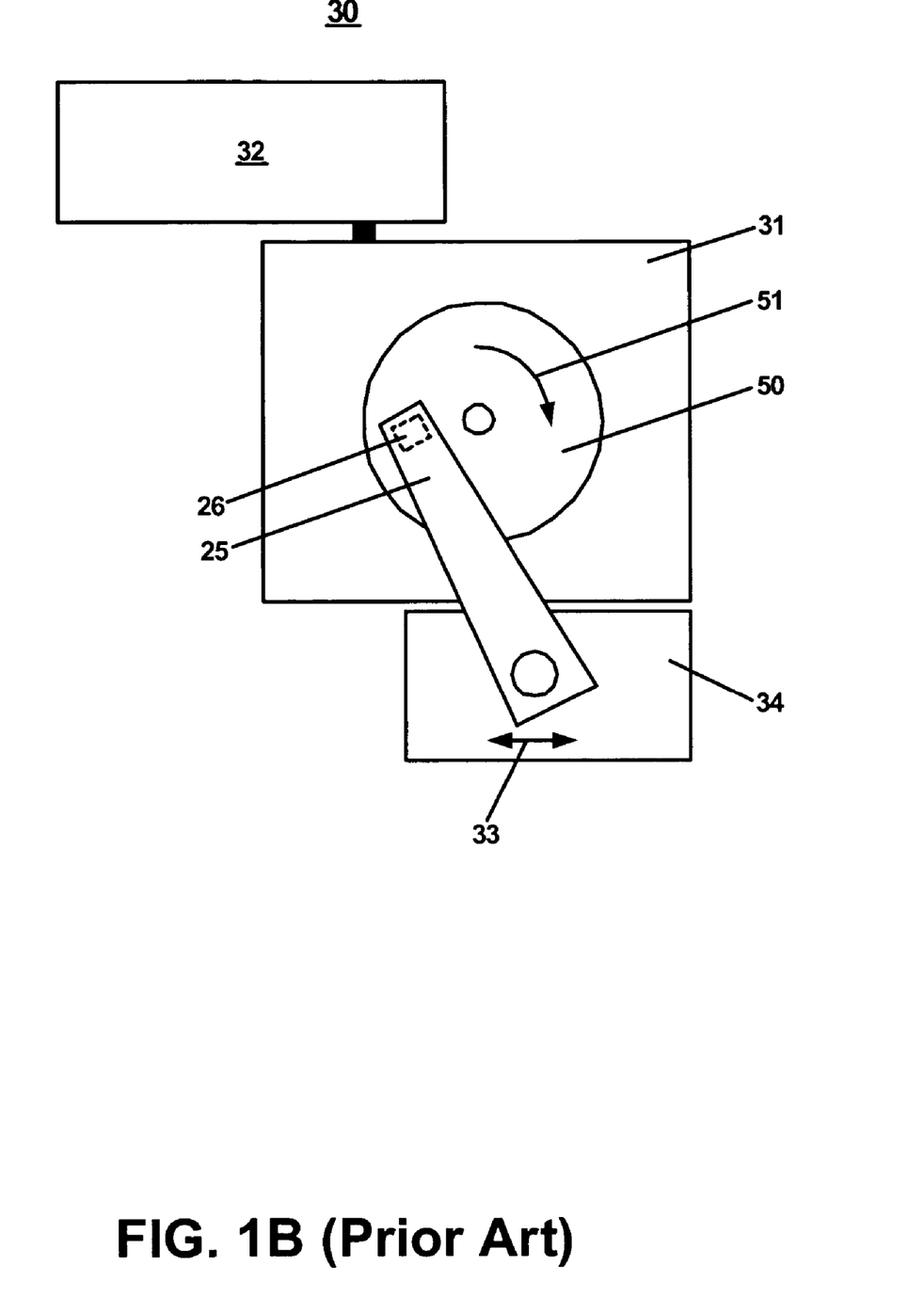
FIG. 1B is a prior art block diagram of a conventional DET testing device for performing electrical tests during the read/write head fabrication process of FIG. 1A.

Digressing from flowchart 10, FIG. 1B shows an exemplary test machine 30 for performing DET 15 of FIG. 1A. It is common for a test machine 30 to cost upwards of a quarter of a million dollars (US) per machine. Further, it is not uncommon for companies making hard disk drives to have hundreds or thousands of test machines 30 for performing a DET 15. Shown in FIG. 1B are HGA 25 and mounted slider 26. HGA 25 is removably mounted to a device 34. Device 34 is for orienting HGA 25 upon the magnetic data layer of platter 50. Device 34 can move HGA 25 as indicated by arrow 33. FIG. 1B also includes device 31 for rotating a platter 50. Device 31 can rotate platter 50 as indicated by arrow 51. Device 31 rotates platter 50 at a speed equivalent to the rotational speed of the platters in the hard disc drive into which HGA 25 is to be placed. Also shown is a data collector 32 that collects data acquired from devices 31, platter 50, and device 34 during performance of DET 15. DET 15 is fully capable of detecting most characteristical deficiencies and physical problems that may be present in slider 26 and/or HGA 25.

However, DET 15 has some shortcomings. One shortcoming is the cost of DET 15 is non-trivial. Costs can include, but which are certainly not limited to, assembly of an HGA 25 (slider on suspension), placing the HGA into a cartridge for mounting to the expensive testing machinery, labor costs for performing the test, clean room real estate allocated for the testing machinery, cost of the machinery, etc.

Referring back to FIG. 1A, specifically step DET 15 of process 10, when a reader component, e.g., read/write head slider 26 of HGA 25, tests to have acceptable reader characteristics, process 10 proceeds to step 16, a head assembly process. If a read/write head fails DET 15, the entire HGA 25 assembly is then rejected, e.g., disposal 20. Continuing, process 10 then proceeds to step 17, a drive assembly process. Then process 10 proceeds to a final test 18, and if the assembly passes, on to step 19, the delivery of completed hard drives.

However, if the reader (transducer) component of HGA 25, e.g., read/write head slider 26, tests such that the characteristics of the reader according to DET 13 are unsatisfactory, the entire HGA 25 is discarded, e.g., disposal 20. It is noted that discarding an HGA 25 is a non-trivial cost.

SUMMARY OF THE INVENTION

An apparatus and method for characterizing a fabricated read/write head is described. In an embodiment of the present invention, the apparatus for reader characterization is described. The apparatus includes a rotator for rotating a media. The media can contain a signal having a value for a function of a read/write head being assessed. The rotator is operable in conjunction with said apparatus. The apparatus also includes a proximator for proximalizing the media to the read/write head. The proximator is operable in conjunction with said apparatus. The apparatus further includes a writer operable in conjunction with said assembly. The writer writes the signal upon the media. The signal emits the value of the function. The signal is detectable by a reader of the read/write head. The apparatus additionally includes an interface operable in the apparatus for providing removable orientation of the read/write head in an assessing position. The assessing position enables a reader of the read/write head to detect the signal upon rotation of the signal through the assessing position.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

An apparatus and method for testing characteristics of a read/write device in a slider and/or a bar slider is described. In the following description, for purposes of explanation, numerous specific details are set forth in order to provide a thorough understanding of the present invention. It is noted that one skilled in the art will comprehend that the present invention may be practiced without these specific details. In other instances, well-known structures and devices are shown in block diagram form in order to avoid obscuring the present invention.

Some portions of the detailed descriptions, which follow, are presented in terms of procedures, steps, logic blocks, processing, and other symbolic representations of operations that can be performed in the fabrication and testing of read/write devices. These descriptions and representations are the means used by those skilled in the data processing arts to most effectively convey the substance of their work to others skilled in the art. A procedure, executed step, logic block, process, test, etc., is here, and generally, conceived to be a self-consistent sequence of steps, instructions, or tests leading to a desired result. The steps are those requiring physical manipulations of physical entities. Usually, though not necessarily always, these entities take the form of structures, elements, layers implemented and tested during the fabrication of read/write device assemblies. It is usual, although not always, that the manipulations, alone or in combination with computer implemented instructions, and tests are performed by a machine particular to the structure and to the manipulation being performed.

It should be borne in mind, however, that all of these and similar terms are to be associated with the appropriate physical entities and are merely convenient labels applied to these entities. Unless specifically stated otherwise as apparent from the following discussions, it is appreciated that throughout the present invention, discussions utilizing terms such as "rotating" or "writing" or "detecting" or "reading" or "providing" or "proximalizing" or "disposing" or "comparing" or the like, refer to the actions and processes of a read/write device fabrication process or similar technique that manipulates and transforms those entities into operable read/write devices or other such data storage enabling devices.

The present invention is discussed primarily in the context of assessing the functional characteristics of read/write device assemblies, such as a current perpendicular plane (CPP) or a current in plane (CIP) reader device. Embodiments of the present invention are well suited to be utilized in testing perpendicular and longitudinal recordings. Further, it is noted that the present invention can be used with other types of read/write devices and associated fabrication devices that have the capability to affect access upon a storage device and from which data can be stored and/or otherwise manipulated.

Figure 2A:
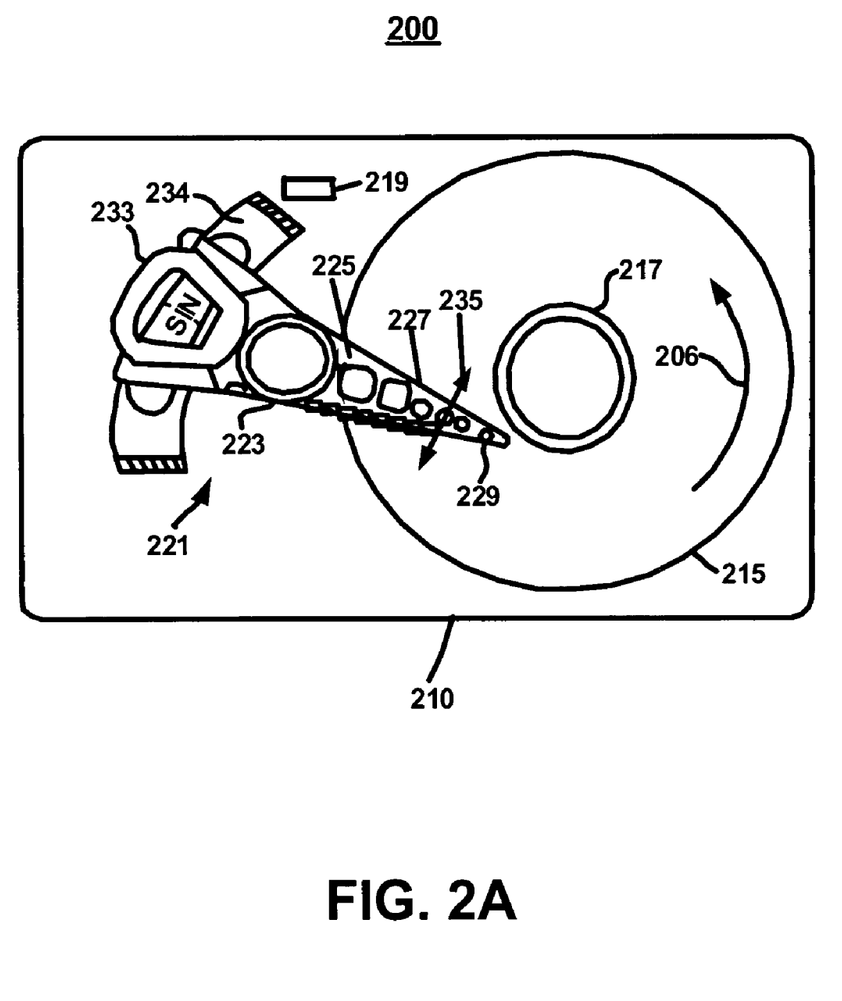
FIG. 2A is an illustrated top-view schematic of components of a hard disc drive upon which embodiments of the present invention can be practiced, in accordance with an embodiment of the present invention.

With reference now to FIG. 2A, a schematic drawing of one embodiment of an information storage system comprising a magnetic hard disk file or drive 200 for a computer system is shown. Drive 200 has an outer housing or base 210 containing a disk pack having at least one media or magnetic disk 215. The disk or disks 215 are rotated (see arrows 206) by a spindle motor assembly having a central drive hub 217. An actuator 221 comprises a plurality of parallel actuator arms 225 (one shown) in the form of a comb that is movably or pivotally mounted to base 210 about a pivot assembly 223.

In the embodiment shown, each arm 225 has extending from it at least one cantilevered load beam and a suspension 227. A slider 229 includes a magnetic read/write transducer or head is mounted or secured to a suspension 227. The read/write devices magnetically read data from and/or magnetically write data to disk 215. The level of integration called the head gimbal assembly is slider 229, mounted to suspension 227. The slider 229 is usually bonded to the end of suspension 227. The head is typically "pico" size (approximately 1250×1000×300 microns) and formed from ceramic or intermetallic materials. The head also may be of "femto" size (approximately 850×700×230 microns) and is pre-loaded against the surface of disk 215 (in the range two to ten grams) by suspension 227. It is noted that alternative sized heads may also be implemented.

Suspensions 227 have a spring-like quality, which biases or urges the air-bearing surface of the slider 229 against the disk 215 to cause the slider 229 to fly at a precise distance from the disk. A voice coil 233 free to move within a conventional voice coil motor magnet assembly 234 (top pole not shown) is also mounted to arms 225 opposite the head gimbal assemblies. Actuator 221 moves the head gimbal assemblies (indicated by arrow 235) along radial arcs across tracks on the disk 215 until the heads settle on their respective target tracks. The head gimbal assemblies operate in a conventional manner and always move in unison with one another, unless drive 211 uses multiple independent actuators (not shown) wherein the arms can move independently of one another.

Figure 2B:
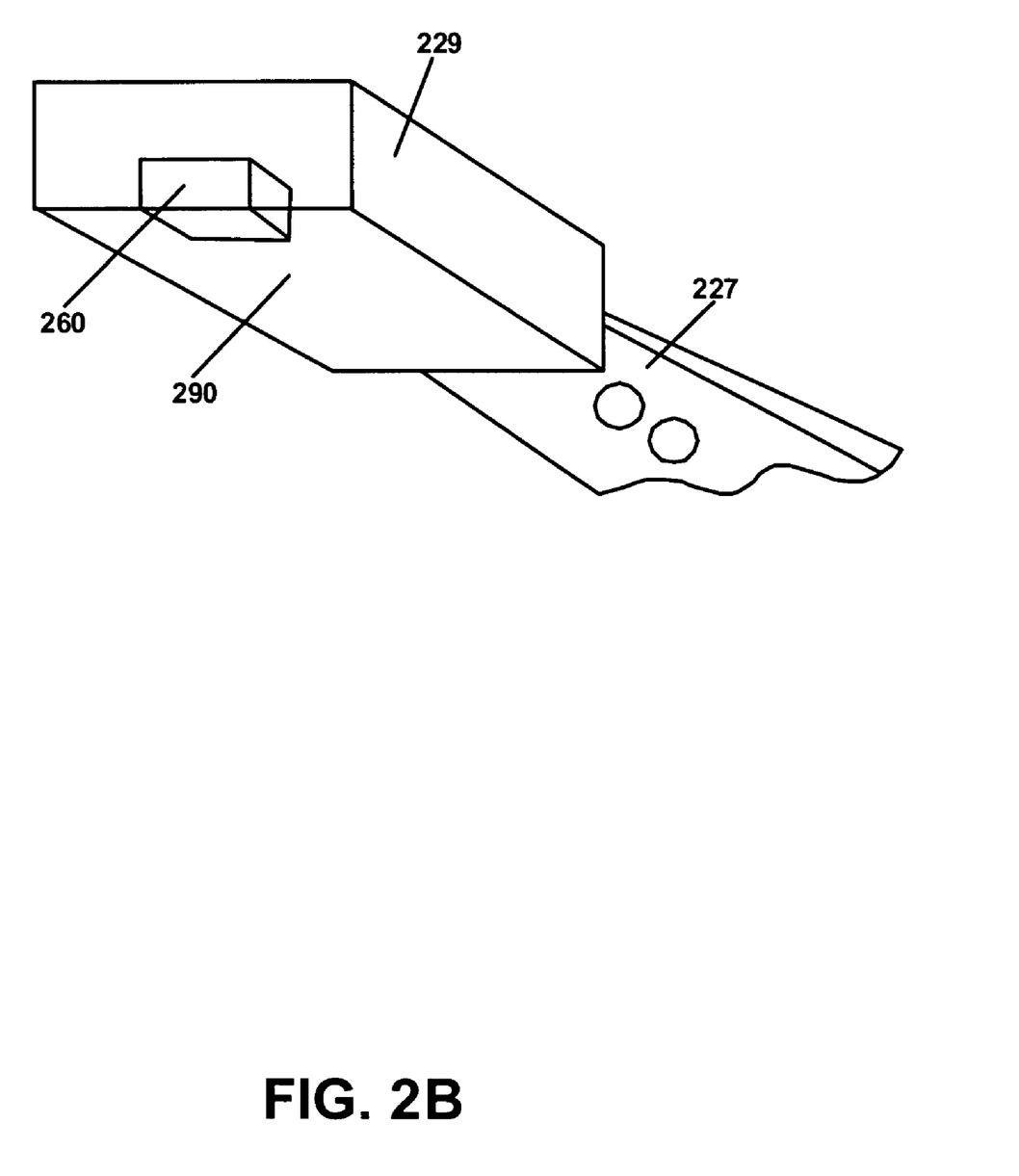
FIG. 2B is an exploded view block diagram of a read/write head component of FIG. 2A upon which embodiments of the present invention can be practiced, in accordance with an embodiment of the present invention.

FIG. 2B is an exploded view of a suspension 227 as shown in FIG. 2A. Upon suspension 227 are shown a slider 229 and a read/write device 260. Slider 229 is the intermediate component to which read/write device 260 is embedded at its trailing edge. Read/write device 260 magnetically reads data from and/or magnetically writes data to disk 215 (FIG. 2A). Read/write device 260 is for sensing a charge state of a data bit of disc 215 and for affecting a change in a charge state. Read/write device 260 is oriented to be operable proximal to the gap between the bottom surface of read/write device 260, e.g., surface 290, and the data bearing surface of disc 215. Surface 290 is commonly referred to the air-bearing surface (ABS). Embodiments of the present invention provide an apparatus and method for assessing the functioning of a read sensor (e.g., read sensor 306 of FIG. 4) of read/write device 260 while disposed on slider 229.

Figure 3:
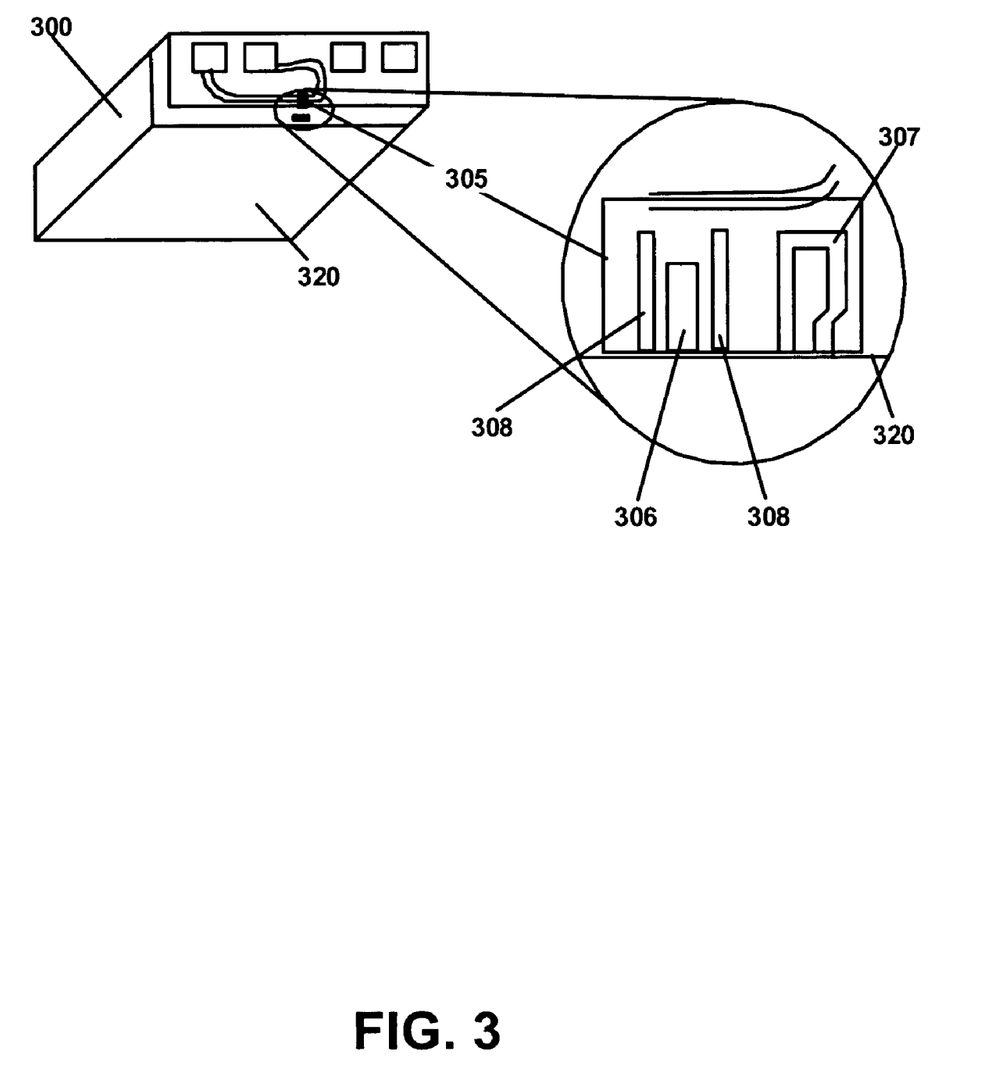
FIG. 3 is a block diagram of a fabricated read/write head slider in accordance with an embodiment of the present invention.

FIG. 3 is a front-facing block diagram illustrating a slider 300, subsequent to the slicing thereof and readied for testing, in an embodiment of the present invention. Slider 300 is implementable as and functionally analogous to slider 229 of FIGS. 2A and 2B. It is noted that many prior processes have been performed on slider 300 to reach a testing stage including, but not limited to, lithography, deposition (vacuum, plating, or sputtering), sensor deposition, shunt deposition, etching, and slicing. Examples of etching processes can include, but which is not limited to, broad-beam ion etching, reactive ion etching, ion-beam etching, polymer etching, and other similar processes.

With continued reference to FIG. 3, in an embodiment, subsequent to fabrication and slicing, slider 300 is shown to include a read/write device 305 and an air-bearing surface (ABS) 320. In the exploded view of read/write device 305, included are a read sensor 306, a write device 307, and a plurality of magnetic shields 308. Read sensor 306 and write device 307 are for reading from and writing to a field from a data storage device, e.g., a hard disc 215 of FIG. 2B, respectively. Magnetic shields 308 are for protecting against read sensor 306 detecting states of charge from data fields other than the data field intended to be sensed. Shown also is surface 320, the air-bearing surface of slider 300.

Figure 4:
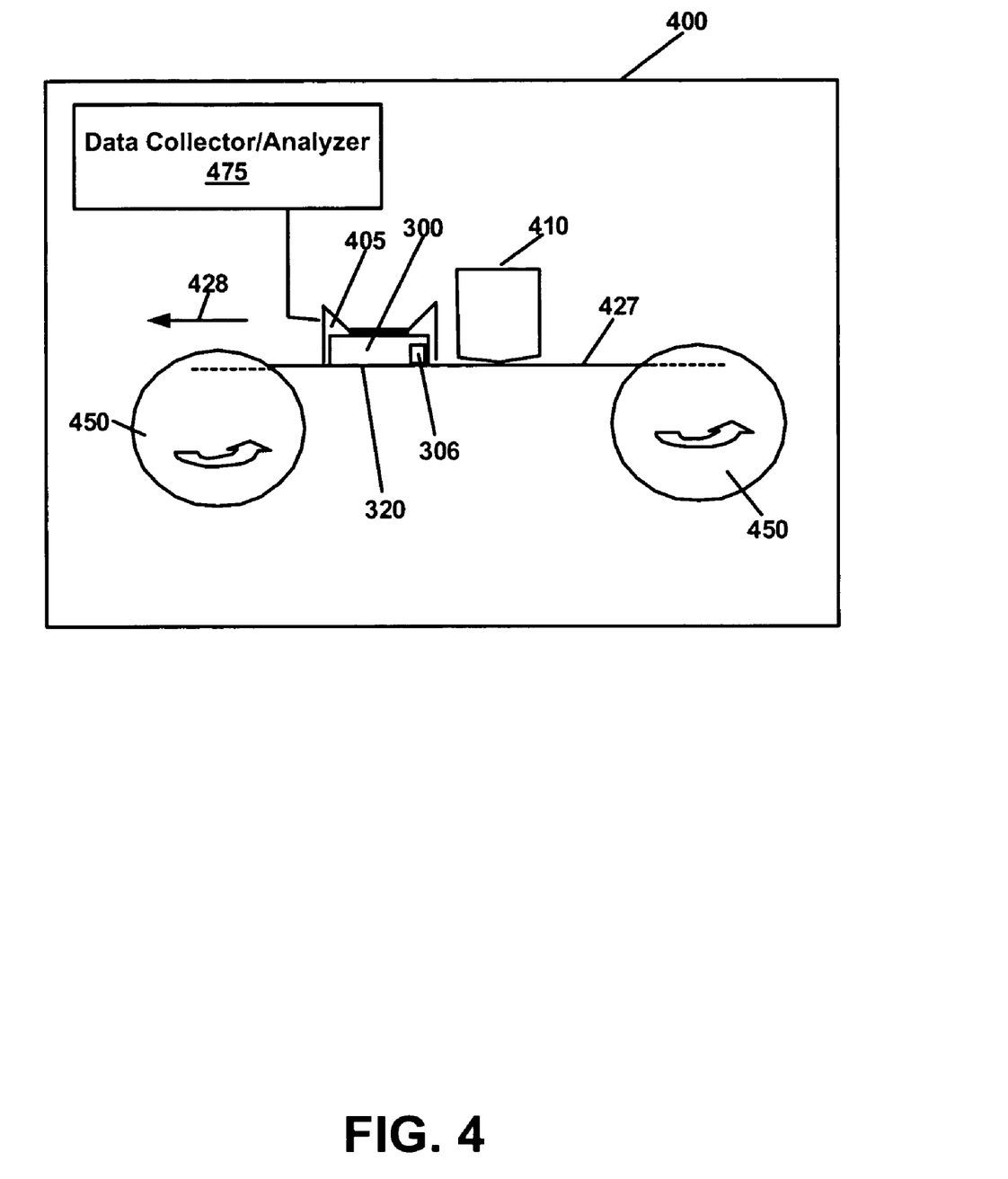
FIG. 4 is a schematic block diagram of a testing apparatus for characterizing a fabricated read/write head slider, in accordance with an embodiment of the present invention.
Figure 5:
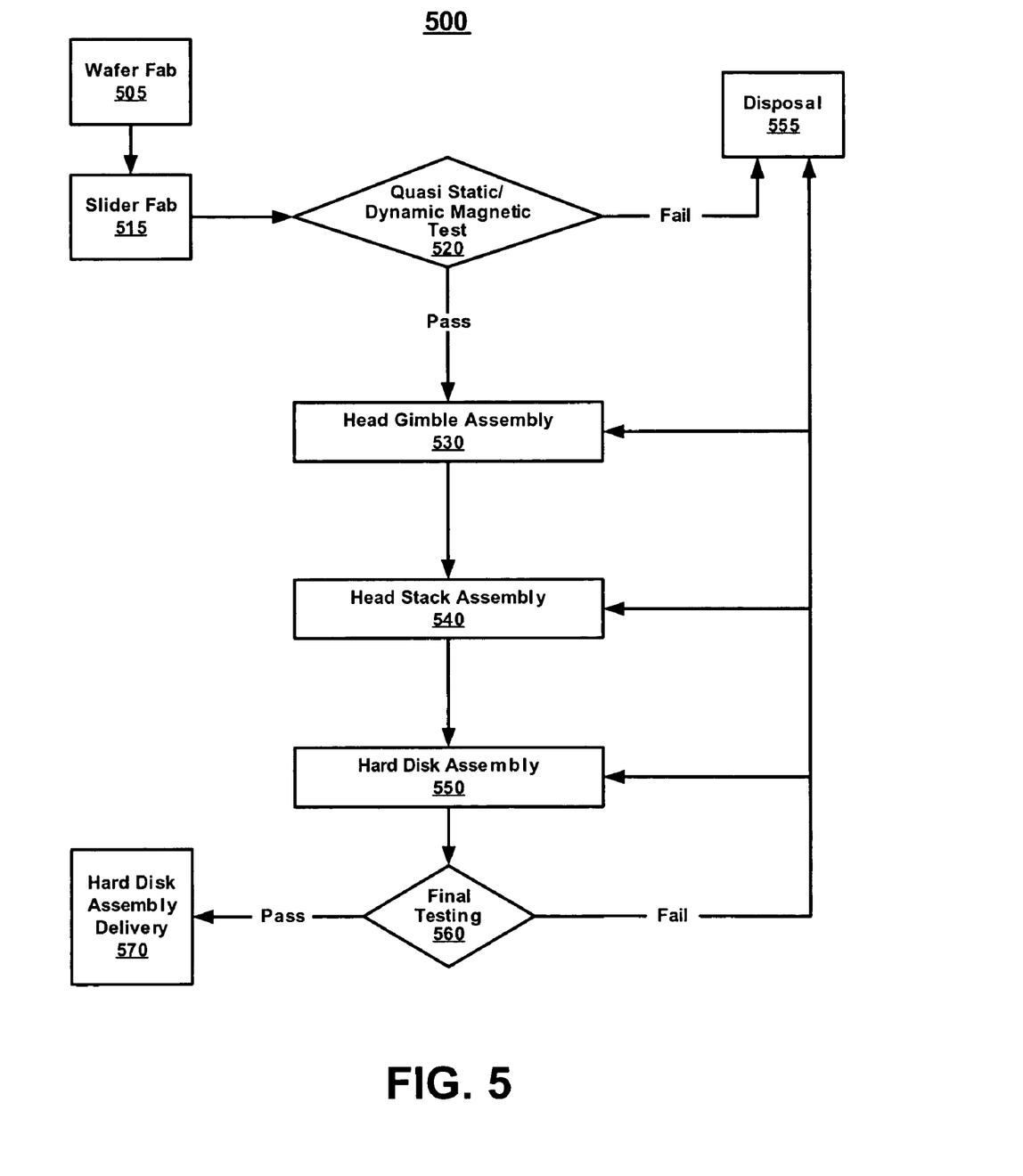
FIG. 5 is a flowchart of a test process applied upon a fabricated read/write head slider, in accordance with an embodiment of the present invention.

FIG. 4 is a schematic block diagram of a tester 400 for performing a test 520 (FIG. 5). Test 520 is for assessing the functions and characteristics of a read sensor 306 in a read/write device mounted in a slider, e.g., read/write device 305 of slider 300 of FIG. 3, in an embodiment of the present invention, and as described herein with reference to FIG. 5. Tester 400 includes rotators 450 for rotating a media 427 in a direction, as indicated by arrow 428. In an embodiment, media 427 is magnetic tape. In an alternative embodiment, media 427 is sputtered magnetic tape. It is noted that media 427 may be nearly any alternative flexible media enabled to store data thereon and to which data can be written and from which data can be read.

Tester 400 also includes a writer 410 for writing data to media 427. Writer 410 is for writing a signal onto a magnetic data layer of media 427 for use as a value during the performing of test 520, in an embodiment of the present invention. It is noted that writer 410 can write a single signal or a plurality of signals having similar or varying values, thus providing a range of values. Tester 400 further includes a cartridge 405 for receiving a slider 300. Slider 300 is oriented in a testing position allowing tester 400 to perform test 520 thereon when slider 300 is removably received in cartridge 405. When slider 300 is disposed in cartridge 405, thus in a testing position, ABS surface 320, analogous to ABS 320 of FIG. 3, faces a magnetic data layer of media 427.

Tester 400 additionally includes one or more large data collector/analyzer(s) 475 that is/are communicatively coupled therewith for collecting and analyzing data generated during test 520, in an embodiment of the present invention.

Continuing with FIG. 4, in an embodiment of the present invention, a slider 300 is deposited in cartridge 405 subsequent to wafer and slider fabrication, as described in FIG. 3. In an embodiment, cartridge 405 is configured to receive an individual slider 300. In another embodiment, cartridge 405 can be configured to receive multiple sliders 300, e.g., a slider bar.

Once a slider 300 is properly disposed in cartridge 405, rotators 450 rotate media 427 and write device 410 writes a signal onto the magnetic data layer of media 427. Rotators 450 rotate media 427 so the field of media 427 having the signal written thereon is moved past slider 300 and read sensor 306. Read sensor 306 of slider 300 detects the signal on media 427 as the field of media 427, onto which the signal was written, is moved past slider 300. In an embodiment of the present invention, media 427 is moved in a right to left direction, as indicated by arrow 428.

Still referring to FIG. 4, as the field of media 427 having the signal written thereon moves past read sensor 306 of slider 300, as indicated by arrow 428, read sensor 306 detect the value of the signal written, in an embodiment of the present invention. An advantage of read sensor 306 detecting the signal written by write device 410 is that it enables data collector/analyzer 475 to compare the value of the signal written by writer 410 to the values sensed by read sensor 306 of slider 300. This provides more thorough and accurate data for assessing the characteristics of slider 300.

In one embodiment, media 427 may be rotated past surface 320 of slider 300 in a non-flying position. In an alternative embodiment, media 427 may be rotated past surface 320 of slider 300 in a flying position. Regardless of the flying position, it is noted that slider 300 remains statically positioned while the field of media 427 having the signal written thereon is motioned past slider 300. Tester 400 enables proper characterizing (testing) of slider 300 by combining a quasi-static test (QST) and a dynamic electrical test (DET) into a single test process, e.g., test 520. Further, tester 400 enables characterization of slider 300 while obviating the need for assembling a head gimble assembly prior to performing a DET test, as described herein with reference to head assembly step 14 and test 15 of FIG. 1A, in accordance with an embodiment of the present invention.

FIG. 5 is a flowchart 500 of a process for steps performed in accordance with one embodiment of the present invention for assessing the characteristics of a slider 300. Flowchart 500 includes processes of the present invention which, in one embodiment, are carried out by fabrication and processing devices and components under the control of computer readable and computer executable instructions. The computer readable and computer executable instructions enable the fabrication, processing, and testing of a slider, e.g., slider 300. The computer readable and computer executable instructions may reside in any type of computer readable medium. Although specific steps are disclosed in flowchart 500, such steps are exemplary. That is, the present invention is well suited to performing various other steps or variations of the steps recited in FIG. 5. Within the present embodiment, it should be appreciated that the steps of flowchart 500 may be performed by software, by hardware or by any combination of software and hardware for assessing the characteristics of a slider 300, in an embodiment of the present invention.

In step 505 of FIG. 5, a wafer fabrication process 505 is performed, forming multiple read/write devices, e.g., read/write device 305, in each of which is disposed a read sensor 306, of FIG. 4, in an embodiment of the present invention. Subsequent to wafer fabrication 505, flowchart 500 proceeds to step 515.

Step 515 is a slider fabrication process 510 that is performed upon the wafer containing read/write device 305, in an embodiment of the present invention. In slider fabrication 515, individual read/write devices 305 are sliced and lapped, creating a slider 300 (FIG. 3). Alternatively, multiple read/write devices 305 are sliced and lapped together, creating a slider bar. In an embodiment, a slider bar is a collection of sliders 300. Subsequent to slider fabrication process 515, the flowchart proceeds to step 520 for testing the characteristics of slider 300.

Referring to step 520, a slider level dynamic magnetic test 520 is performed on slider 300 (FIG. 3) through utilization of a tester, e.g., tester 400, as described herein with reference to FIG. 4, in an embodiment of the present invention. In slider level dynamic magnetic test 520, the tests conventionally implemented in a plurality of tests, e.g., a QST and a DET, as described in FIG. 1A, are combined. It is noted that slider level dynamic magnetic test 520 does not require a head gimble assembly to be assembled prior to having slider 300 characteristically assessed. Thus slider level dynamic magnetic test 520 can obviate the need for a head assembly 14 for use in a test 15, as described in FIG. 1A. Therefore, upon a slider 300 having a dissatisfactory assessment, embodiments of the present invention enable a slider 300 to be discarded, e.g., disposal 555, obviating the need for assembly of and/or discarding a head gimble assembly as in conventional assessing processes.

Still referring to step 520, slider level dynamic magnetic test 520 can, in an embodiment, include testing slider 300 for amplitude, asymmetry, and stability. Further, test 520 can include testing slider 300 for track average amplitude (TAA), comparison to bias, and track average amplitude asymmetry. It is noted that because shields, e.g., magnetic shields 308 of FIG. 3, present in slider 300 are not saturated in a uniform environment, data collected during test 520 will have a greater correlation to real-time values than a convention static test, e.g., test 13 of FIG. 1A.

For example, once slider 300 is oriented in cartridge 405 of tester 400, writer 410 writes a signal to media 427 having a value of 4. Rotators 450 cause media 427 to move in the direction of arrow 428. As the signal written on media 427 is moved past slider 300, via rotators 450, read sensor 306 of slider 300 detects a 3.5 value. This discrepancy can indicate an incorrect calibration for writer 410 or the field onto which the signal was written may have a defect. As such, the signal can be re-written by writer 410 and/or writer 410 may be recalibrated, in an embodiment of the present invention. In another embodiment, this discrepancy can also indicate a faulty read sensor 306, and as such, read sensor 306 can be rejected, while obviating the need for an HGA process, as described in FIG. 1A.

In another example, using the same signal value of 4, when the field of media 427 having the written signal is rotated past read sensor 306 and read sensor 306 detects a signal value of 4, this can indicate that read sensor 306 is fully functional and can provide proper sensing of states of data disposed on a media storage device, e.g., disk 215 of FIG. 2A.

Continuing with step 520, it is noted that as the field of media 427 having a signal written thereon is moved past read sensor 306 of slider 300, the movement enables data to be generated relative to most characteristics of a slider 300 that are necessary for proper characterization. It is further noted that slider 300, once disposed in cartridge 405 is statically positioned. Further, because of a signal being written to media 427, instead of a slider 300 being emersed in a uniform environment, as described in step 13 of FIG. 1A, the characterization of slider 300 is more complete as the signal sensed by read sensor 306 of slider 300 is representative of real conditions, thus decreasing the dependence upon correction factors used to simulate a real signal, as described in FIG. 1A. Thus, embodiments of the present invention can provide a reduction in read/write device fabrication and related testing costs when compared to conventional fabrication and testing methods, e.g., FIG. 1A.

In step 530 of flowchart 500, a head gimble assembly 225, as described herein with reference to FIG. 2A and 2B is assembled, in an embodiment of the present invention. It is noted that head gimble assembly 225 is a necessary component in a completed a hard disc drive 200, HGA 225 is not used in performing an assessment of characteristics of a read sensor 306 of slider 300 in accordance with an embodiment of the present invention. In the present embodiment, subsequent to completion of an HGA 225, flowchart processes to step 540.

In step 540 of flowchart 500, the head gimble assembly 225 is assembled in a head stack assembly, in an embodiment of the present invention. Subsequent thereto, flowchart 500 proceeds to step 550.

In step 550 of flowchart 500, the head stack assembly is assembled into a hard disc assembly (HDA) in an embodiment of the present invention. Subsequent thereto, flowchart 500 proceeds to step 560.

In step 560 of flowchart 500, a final test 560 is performed on the HDA in an embodiment of the present invention. If the HDA fails test 560, flowchart 500 may proceed to disposal 555. Alternatively, flowchart 500 may return to Test 520, HGA 530, HSA 540, or HDA 550, depending upon the faults found during final testing 560. If the HDA being tested passes, the flowchart proceeds to step 570, the delivery of the HDA for utilization as a hard disc drive.

Advantageously, embodiments of the present invention provide for improved characterization of a fabricated read/write device in a slider and/or a slider bar. Further, embodiments also provide a testing apparatus for providing a more complete and thorough assessing of the characteristics of a fabricated read/write device in a slider and/or a bar slider. Additionally, embodiments provide a method for assessing the characteristics of a fabricated read sensor in a slider and/or a bar slider in which conventional testing processes are combined into a single test, thus reducing testing time. Also, embodiments of the present invention further provide for obviation of an assembly process utilized during a conventional testing process.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for assessing read/write head function comprising:
   a rotator for rotating a media, said media a tape for containing a signal having a value, said value for a function of said read/write head being assessed, said rotator integrated with and operable in conjunction with said apparatus;
   a proximator for proximalizing said media to said read/write head, said proximator integrated with and operable in conjunction with said apparatus;
   a writer integrated with and operable in conjunction with said apparatus, said writer for writing said signal upon said media, said signal emitting said value of said function, said signal detectable by a reader of said read/write head; and
   an interface integrated and operable with said apparatus, said interface for providing removable orientation of said read/write head in an assessing position, said assessing position prior to coupling of said read/write head to an HGA (head gimble assembly), said assessing position enabling a reader of said read/write head to detect said signal upon rotation of said signal through said assessing position.

2. The apparatus as recited in claim 1 further comprising:
   a detector for detecting detection by said reader of said value emitted by said signal, said detector integrated with and operable in conjunction with said apparatus.

3. The apparatus as recited in claim 2 further comprising:
   a comparator for rejecting said read/write head when a detected value of said signal is unfavorably comparable to said value of the signal written upon said media or for approving said read/write head when said detected value of said signal is favorably comparable to said value of said signal written upon said media.

4. The apparatus as recited in claim 1 wherein said proximator proximalizes said media to said read/write head in a non-flying condition.

5. The apparatus as recited in claim 1 wherein said tape is magnetic tape.

6. The apparatus as recited in claim 1 wherein said tape is sputtered magnetic tape.

7. The apparatus as recited in claim 1 wherein said writer is configured to write a wide signal when said media upon which said signal is to be written is configured to receive a wide signal.

8. A method for assessing a function of a read/write head comprising:
   providing a magnetic data layer of a media upon which an emitted signal can be accessibly disposed, said media a tape having a region for containing said signal, wherein the emission of said signal provides a value for said function of said read/write head to be assessed,
   proximalizing said magnetic data layer to a surface of said read/write head enabling a reader of said read/write head detection of said signal, said read/write head removably mounted to an assessing mechanism, said assessing mechanism for performing said assessing, said assessing performed prior to coupling said read/write head to an HGA (head gimble assembly);
   writing said signal to said region, said writing providing said signal for detection by said reader, said writing performed by a writer mechanism integrated with said assessing mechanism; and
   rotating said magnetic data layer such that said region of said media upon which said emitting signal is positioned for said reader to detect said value, said rotating performed by a rotator integrated with said assessing mechanism.

9. The method as recited in claim 8 further comprising:
   detecting said value of said signal being emitted, said detecting performed by said reader subsequent to said rotating.

10. The method as recited in claim 9 further comprising favorably assessing said reader when said detected signal value and said value emitted by said signal fulfills criteria applicable to said function.

11. The method as recited in claim 9 further comprising unfavorably assessing said reader when said detected signal value and said value said emitted by said signal do not fulfill criteria applicable to said function.

12. The method as recited in claim 8 wherein said writing further comprises:
   widening said region of said media such that said signal being emitted is more readily detectable by said reader of said read/write head during said assessing.

13. The method as recited in claim 12 wherein said widening further comprises
   widening the width of said writer proportional to a widening of the region of said media upon which said signal is to be written.

14. The method as recited in claim 8 wherein said providing further comprises:
   utilizing magnetic tape as said tape and upon which said magnetic data layer is provided.

15. The method as recited in claim 8 wherein said providing further comprises:
   utilizing a sputtered magnetic tape as said tape and upon which said magnetic data layer is provided.

16. An apparatus for assessing a function of a read/write head comprising:
   means for rotating a tape media, said means for rotating integrated and operable with said apparatus;
   means for engaging said tape media with said read/write head, said means for engaging integrated and operable with said apparatus;
   means for storing a signal, said means for storing said signal said tape media having a surface upon which said signal is accessibly stored, said tape media removeably coupleable to said means for rotating;
   means for writing said signal to said tape media, said means for writing integrated and operable with said apparatus, said signal emitting a value applicable to a function of said read/write head;
   means for removeably affixing said read/write head on said apparatus, said means for removeably affixing enabling removable mounting of said read/write head to said apparatus, said apparatus obviating coupling to components in an HGA (head gimble assembly);
   means for detecting said value emitted by said signal, said means for detecting integrated and operable with said apparatus, said means for detecting detection of said value emitted by said signal by a reader of said read/write head; and
   means for comparing a detected value of said signal with said value of said signal written to said tape media, said means for comparing integrated and operable with said apparatus.

17. The apparatus as recited in claim 16 wherein said means for comparing further comprises:
   means for rejecting said read/write head when said value detected by said reader and said value of said signal are not acceptable according to criteria applicable to said function; and
   means for accepting said read/write head when said value detected by said reader and said value of said signal are acceptable according to criteria applicable to said function.

18. The apparatus as recited in claim 16 wherein said means for storing said signal is magnetic tape media.

19. The apparatus as recited in claim 16 wherein said means for storing said signal is a sputtered magnetic tape media.

20. The apparatus as recited in claim 16 further comprising: means for widening said means for writing, said means for widening enabling said means for writing to write a wider signal for said read/write head to detect, said wider signal enabling greater detection by said read/write head, said media configured to accept said wider signal.

* * * * *